US011254065B2

(12) United States Patent
Sala et al.

(10) Patent No.: US 11,254,065 B2
(45) Date of Patent: Feb. 22, 2022

(54) SUPPORT DEVICE FOR A TUBULAR ELEMENT FOR A WELDING APPARATUS AND WELDING APPARATUS COMPRISING THE SUPPORT DEVICE

(71) Applicant: DELCON S.R.L., Milan (IT)

(72) Inventors: Norberto Sala, Arcore (IT); Fabio Belletti, Ivrea (IT); Mauro Bresciani, Azzano San Paolo (IT)

(73) Assignee: DELCON S.R.L, Milan (IT)

(*) Notice: Subject to any disclaimer, the term of this patent is extended or adjusted under 35 U.S.C. 154(b) by 0 days.

(21) Appl. No.: 16/622,265

(22) PCT Filed: Jun. 13, 2018

(86) PCT No.: PCT/IT2018/050106
§ 371 (c)(1),
(2) Date: Dec. 12, 2019

(87) PCT Pub. No.: WO2018/229807
PCT Pub. Date: Dec. 20, 2018

(65) Prior Publication Data
US 2020/0207028 A1    Jul. 2, 2020

(30) Foreign Application Priority Data
Jun. 14, 2017    (IT) .................... IT102017000066241

(51) Int. Cl.
*B29C 65/78*      (2006.01)
*B29C 65/00*      (2006.01)

(52) U.S. Cl.
CPC ...... *B29C 65/7802* (2013.01); *B29C 65/7841* (2013.01); *B29C 66/4312* (2013.01); *B29C 66/8322* (2013.01); *B29C 66/857* (2013.01)

(58) Field of Classification Search
CPC .............. B29C 66/857; B29C 66/4312; B29C 66/8322; B29C 66/861; B29C 66/8618;
(Continued)

(56) References Cited

U.S. PATENT DOCUMENTS 2,379,060 A * 6/1945 Bacheldor ............. A47L 13/512
248/113
2004/0035844 A1    2/2004 Wright et al.

FOREIGN PATENT DOCUMENTS

DE    29518196 U1    3/1996
JP    H07195526 A    8/1995
(Continued)

OTHER PUBLICATIONS

International Search Report and Written Opinion for PCT/IT2018/050106, dated Sep. 26, 2018.

*Primary Examiner* — John L Goff, II
(74) *Attorney, Agent, or Firm* — Volpe Koenig

(57) ABSTRACT

A support device for a tubular element, includes a housing part configured to house, during use, the tubular element, and at least a mobile part for guiding and positioning the tubular element and for protecting the housing part. The mobile part is configured to assume at least a first position to access the housing part of the tubular element, in order to easily insert the tubular element into the housing part, and to assume at least a second position to retain the tubular element and to at least partly cover said housing part and the tubular element positioned therein. The mobile part includes a lever for passage from the first position to the second position and drivable by the tubular element during its insertion into the housing part.

10 Claims, 3 Drawing Sheets

(58) Field of Classification Search
CPC ............ B29C 66/8324; B29C 65/7802; B29C 65/7841; B29C 65/78; B29C 65/04; B29C 65/743; B25B 1/20; B25B 5/147; B25B 5/04

See application file for complete search history.

(56) References Cited

FOREIGN PATENT DOCUMENTS

WO     WO-2005/107994 A2    11/2005
WO     WO-2016/079702 A1     5/2016

\* cited by examiner

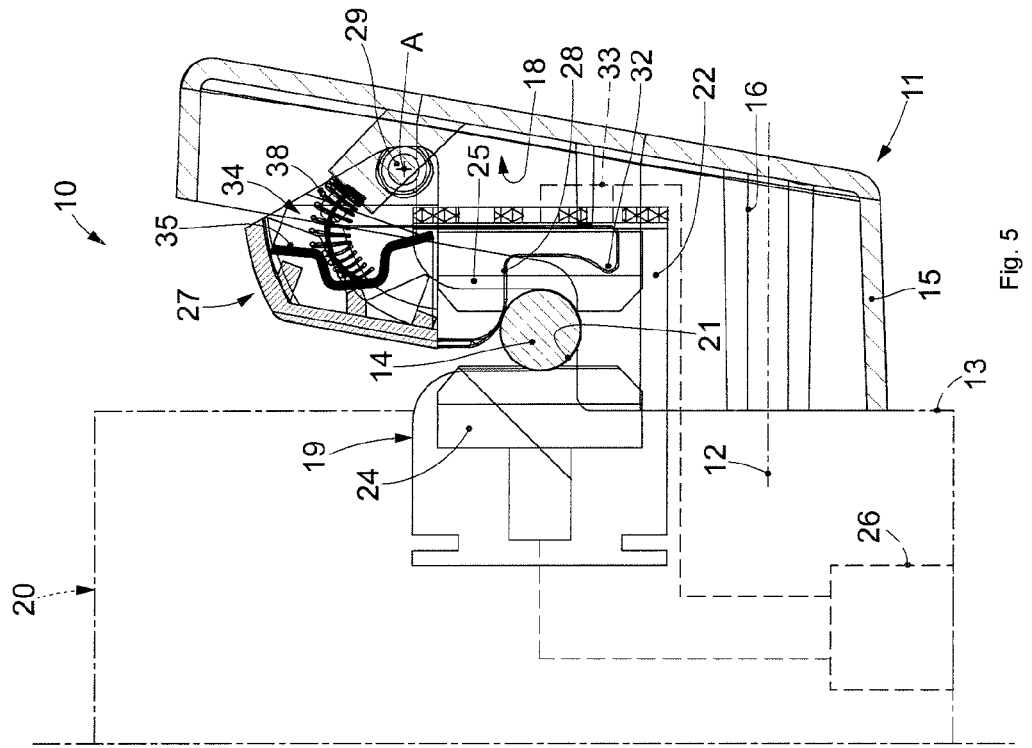
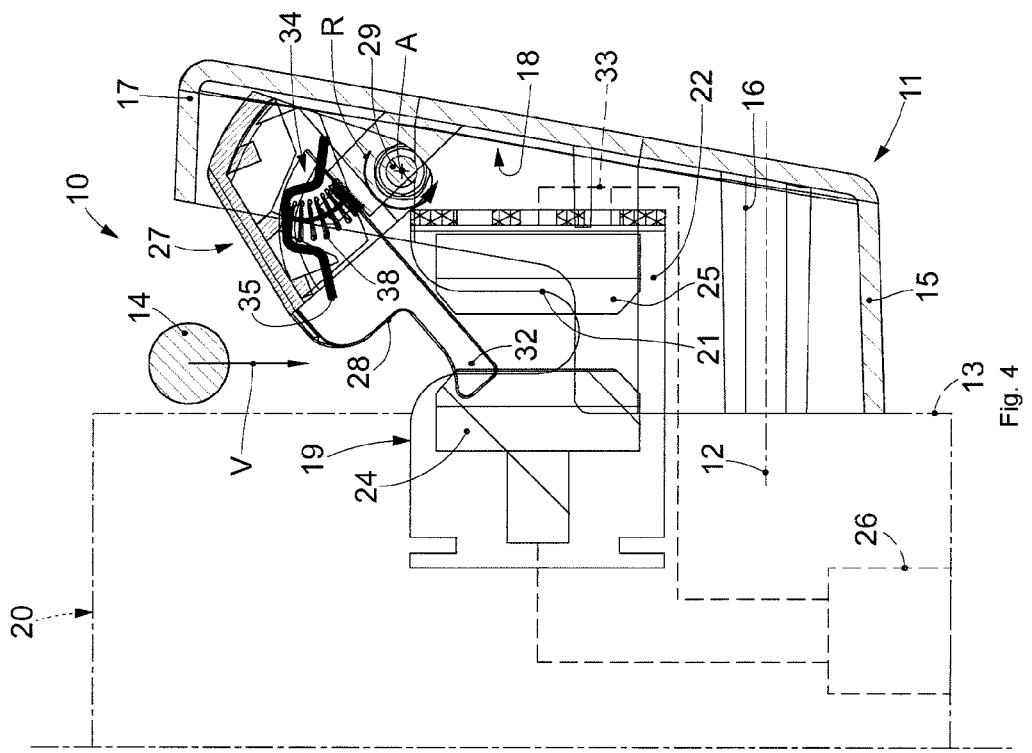

SUPPORT DEVICE FOR A TUBULAR ELEMENT FOR A WELDING APPARATUS AND WELDING APPARATUS COMPRISING THE SUPPORT DEVICE

FIELD OF THE INVENTION

The present invention concerns a support device, in particular to guide and retain a tubular element, for example a tubular element made of plastic or suchlike able to be welded by means of a radiofrequency welding apparatus, or suchlike. The tubular element can be used, for example, in the medical field for the passage of biological liquids, in particular blood, blood fractions and/or blood products, or suchlike.

BACKGROUND OF THE INVENTION

It is known that in the medical field of blood transfusion, blood, or blood fractions (blood products and/or blood components), or in general blood fluids, can be taken and/or respectively supplied from/to the patient by using bags, normally containing an anticoagulant, connected to plastic tubes or tubular elements inside which the blood or blood fractions flow.

It is known, in this context, that it is necessary to weld the plastic tubes or tubular elements in which the blood or blood fractions pass, in order to block the flow, to isolate samples to be subjected to analysis, in particular to close and separate the tube in a sterile manner, or for other needs.

There is, in particular, a need to guarantee that the welding of the tubes is reliable, fast, does not produce pollution of the sample, that it is fluid-sealed, stable and resistant. Furthermore, other requirements of the welding are that it must not damage the molecules of the blood and that it must allow easy separation of the two welded flaps, maintaining the seal on both sides, that is, the two ends of the separate tubes.

The blood collection bags are then subjected, generally at the end of the donation operations or the processing of the blood components, to welding of the tubular element or the tubular elements connected to the collection bag, generally by means of radiofrequency welding apparatuses, equipped with a welding chamber or seating inside which the tubular element to be welded is positioned and a pair of welding electrodes.

A known welding apparatus, for a tubular element which can be connected to a blood collection bag, is described for example in DE-U-29518196.

Other known welding apparatus are described for example in documents WO-A-2016/079702, JP-A-H07195526, WO-A-2005/107994 and US-A-2004/035844.

One disadvantage of such operations carried out by means of normal welding apparatuses, for example table-top welding apparatuses and/or apparatuses as cited in the above documents, is that often the welding can be undesirably incomplete and not uniform along the whole diameter of the tubular element: this is due above all to accidental movements or incorrect positioning of the tubular element which, in general, is held with two hands by an operator.

Another disadvantage that can occur with known welders is that the blood fluid can escape from the welding chamber or zone of the welder, due to damage and defectiveness of the tube, and contaminate the operator responsible for the welding operations. Known welders, in particular table-top welders, therefore do not allow to correctly and accurately position the tubular element to be welded in the welding chamber or zone where the welding electrodes are present, and moreover known welders are extremely inadequate in the event of sudden spills of blood or similar liquid.

Other limitations and disadvantages of conventional solutions and technologies will be clear to a person of skill after reading the remaining part of the present description with reference to the drawings and the description of the embodiments that follow, although it is clear that the description of the state of the art connected to the present description must not be considered an admission that what is described here is already known from the state of the prior art.

There is therefore a need to obtain a device to support a tubular element for a welder which can overcome at least one of the disadvantages of the state of the art.

One purpose of the present invention is therefore to provide a device to support a tubular element for a welding apparatus, located in correspondence with the welding chamber or seating where the welding means are present, which allows to guide and retain the tubular element to be welded in a stable and effective manner, so as to guarantee an effective and uniform welding, while still allowing, preferably, a possible lateral sliding of the tubular element to be welded.

Another purpose of the present invention is to provide a device to support a tubular element for a welding apparatus which allows effective protection for the tubular element and for the operator during the entire welding operation, which will be carried out, advantageously, in a uniform manner along the whole diameter of the tubular element.

Another purpose of the present invention is to provide a device to support a tubular element for a welding apparatus which, in short, is simple and immediate to use, which guarantees correct positioning of the tubular element to be subjected to welding and which avoids the risk of contamination for the operator in the event of a leakage of blood fluid, or suchlike.

The Applicant has devised, tested and embodied the present invention to overcome the shortcomings of the state of the art and to obtain these and other purposes and advantages.

SUMMARY OF THE INVENTION

The present invention is set forth and characterized in the independent claims, while the dependent claims describe other characteristics of the invention or variants to the main inventive idea.

In accordance with the above purposes, the invention concerns a support device for a tubular element for a welding apparatus comprising at least a housing part configured to house, during use, the tubular element and welding means of the tubular element, and at least a mobile part for guiding and positioning the tubular element and for protecting the housing part; the mobile part is configured to assume at least a first position to access the housing part of the tubular element, in order to easily insert the tubular element into the housing part, and at least a second position to retain the tubular element and to at least partly cover the housing part and the tubular element positioned therein.

According to one aspect of the invention, the mobile part of the support device comprises at least a lever for passage from the first position to the second position and drivable by the tubular element during its insertion into the housing part. According to another aspect of the invention, the support device can comprise a fixed part and snap-in means to connect the mobile part to the fixed part.

The mobile part can be connected to the fixed part by means at least of a rotation pin, inserted into a corresponding hole made on the fixed part and able to allow a rotation of the mobile part with respect to the fixed part at least from the first position to the second position, or vice versa.

The mobile part can comprise at least one segment in contact with the tubular element inserted in the housing part and able to determine the passage of the mobile part from the second position to the first position, during the extraction of the tubular element from the housing part.

The mobile part can be provided with an assembly for bi-stable positioning, so that it can stably keep the first access position of the tubular element and at least the second retention and protection position of the tubular element.

The retention and protection mobile part can be made of transparent material.

The invention also concerns a welding apparatus for a tubular element, comprising at least a pair of welding electrodes and comprising a support device of the tubular element as defined above and positioned in proximity to the welding electrodes.

The housing part of the tubular element can comprise at least a pair of housing seatings of the tubular element situated on opposite sides with respect to the electrodes.

The welding apparatus can comprise at least a sensor to detect the positioning of the mobile part in the second position where it at least partly covers the tubular element.

These and other aspects, characteristics and advantages of the present disclosure will be better understood with reference to the following description, drawings and attached claims. The drawings, which are integrated and form part of the present description, show some forms of embodiment of the present invention, and together with the description, are intended to describe the principles of the disclosure.

The various aspects and characteristics described in the present description can be applied individually where possible. These individual aspects, for example aspects and characteristics described in the attached dependent claims, can be the object of divisional applications.

It is understood that any aspect or characteristic that is discovered, during the patenting process, to be already known, shall not be claimed and shall be the object of a disclaimer.

BRIEF DESCRIPTION OF THE DRAWINGS

These and other characteristics of the present invention will become apparent from the following description of some embodiments, given as a non-restrictive example with reference to the attached drawings wherein:

FIG. 4 is a view of a first access position of the present support device, considered along the section line IV, V-IV, V of FIG. 3;

FIG. 5 is a view of a second retaining position of the present support device considered along the section line IV, V-IV, V of FIG. 3.

To facilitate comprehension, the same reference numbers have been used, where possible, to identify identical common elements in the drawings. It is understood that elements and characteristics of one embodiment can conveniently be incorporated into other embodiments without further clarifications.

DETAILED DESCRIPTION OF SOME EMBODIMENTS

We will now refer in detail to the various embodiments of the present invention, of which one or more examples are shown in the attached drawings. Each example is supplied by way of illustration of the invention and shall not be understood as a limitation thereof. For example, the characteristics shown or described insomuch as they are part of one embodiment can be adopted on, or in association with, other embodiments to produce another embodiment. It is understood that the present invention shall include all such modifications and variants.

Before describing the embodiments, we must also clarify that the present description is not limited in its application to details of the construction and disposition of the components as described in the following description using the attached drawings. The present description can provide other embodiments and can be obtained or executed in various other ways. We must also clarify that the phraseology and terminology used here is for the purposes of description only, and cannot be considered as limitative.

Figure 1:
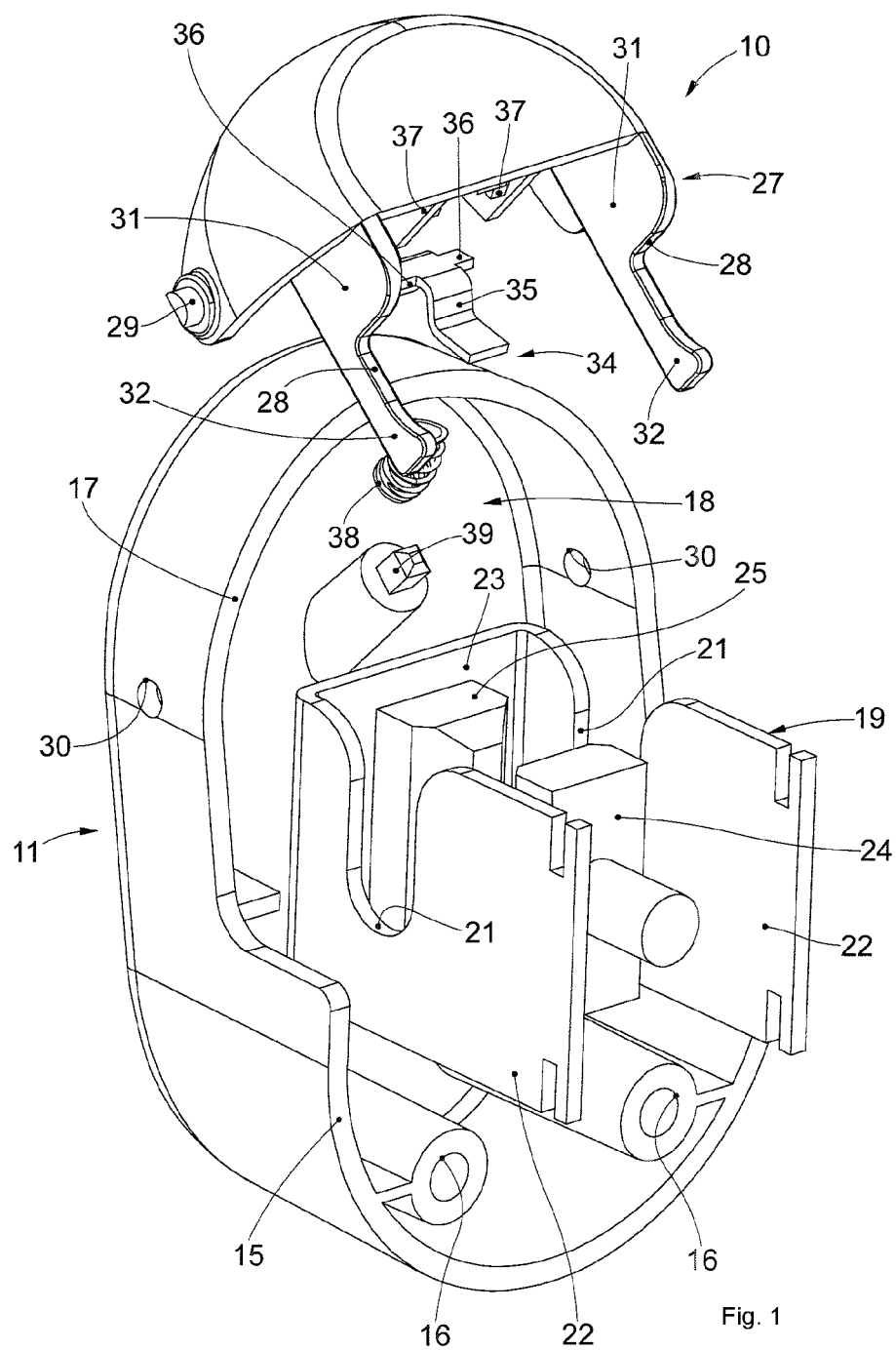
FIG. 1 is a three-dimensional and exploded view of the support device of a tubular element according to the present invention for a welding apparatus.
Figure 3:
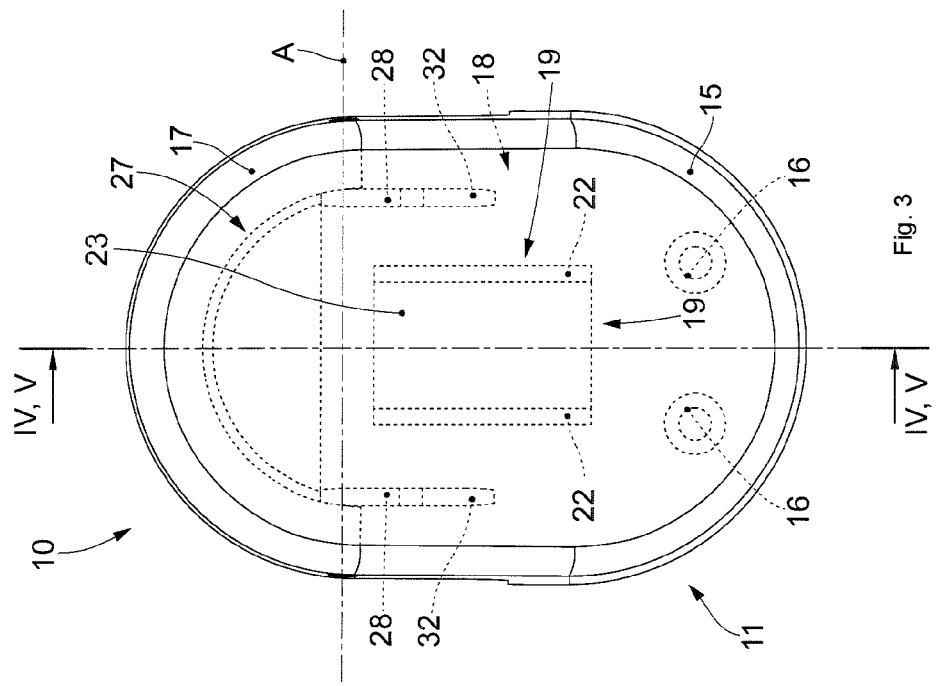
FIG. 3 is a front schematic view of the present support device.
Figure 2:
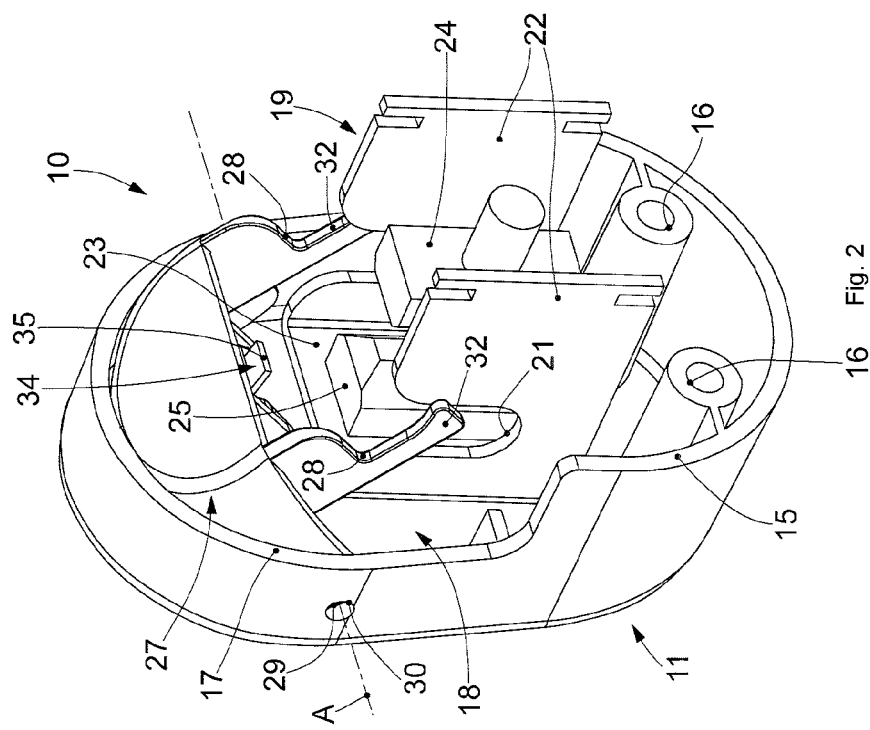
FIG. 2 is a three-dimensional view of the present support device as assembled.

With reference to the attached drawings and according to the present invention, a support device 10 for a tubular element 14, see for example FIG. 1, FIG. 4 and FIG. 5, comprises a fixed part 11 configured to be connected, removably and by means of suitable attachment means 12, such as screws, or release elements, or suchlike, to a wall 13 of a welding apparatus 20, in particular a lateral wall.

The fixed part 11 comprises a portion 15 able to be rested against the wall 13 of the welding apparatus 20 and provided with seatings 16 to insert the attachment means 12.

The fixed part also comprises a portion 17 conformed so as to create a free space between it and the wall 13, so as to allow to insert the tubular element 14 in the support device 10.

Inside the fixed part 11 a welding chamber 18 can be defined in which a housing part 19 of the tubular element 14 is positioned.

The housing part 19 is connected to the internal structure of the welding apparatus 20 and can be made, for example, of metal material.

The housing part 19 can be made substantially in the shape of a "U" and can comprise a pair of housing seatings 21 located on opposite walls 22 of the housing part 19. The opposite walls 22 are joined by a connecting wall 23.

The housing seatings 21 are each positioned on one side of suitable welding means, for example a pair of welding electrodes 24 and 25 of the welding apparatus 20.

The electrodes 24 and 25 are suitably distanced and the tubular element 14 for welding will be positioned between them, therefore the seatings 21, preferably, will be substantially aligned with the space made between the two electrodes 24 and 25 and in which the tubular element 14 will be housed.

A first electrode 24 can be defined as the hot electrode, that is, the electrode that receives the radio frequency signal RF, while a second electrode 25 can be defined as the cold electrode, that is, the electrode which is earthed. The cold electrode 25 can be positioned on the connecting wall 23 of the housing part 19.

The first electrode 24 and second electrode 25 can be mobile with respect to each other, to apply the desired compression on the surfaces of the tubular element 14 located between them during welding. In the example shown, the first electrode 24 will be mobile and the second electrode 25 will be fixed.

At least the electrode 24 can therefore be connected to a control unit 26 which manages and commands the functioning of the welding apparatus 20.

The support device 10 comprises a mobile part 27, configured to be moved from at least a first position in which it allows access of the tubular element 14 to the housing part 19, FIG. 4, to at least a second position where it retains the tubular element 14 in the housing part 19 and protects the housing part 19, see FIG. 5, in which it at least partly covers the tubular element 14.

Therefore, in short, thanks to its movement, the mobile part 27 provides a guide to the correct positioning of the tubular element 14 in the housing part 19 and keeps it, or retains it, in the correct position.

The mobile part 27, as can be seen, also performs a function of protecting the housing part 19 and the tubular element 14 which can be positioned therein.

The mobile part 27 can be made, for example, in the form of a cover, cap or suchlike and can be associated in any way whatsoever with the fixed part 11.

The retention position of FIG. 5 is such that the mobile part 27, advantageously, at least partly covers the tubular element 14, but at the same time prevents an undesired compression thereof and, possibly, allows a lateral sliding thereof.

The tubular element 14 is therefore stably in a welding position between the seatings 21 of the housing part 19 and at least one segment 28 of the mobile part 27, preferably two segments 28 positioned on opposite sides 31 of the mobile part 27.

In the position of FIG. 5, the segments 28 are preferably in contact with the surface of the tubular element 14.

Moreover, the segments 28 have a certain curvature, so as to facilitate the insertion and extraction of the tubular element 14 into and from the housing part 19.

The mobile part 27 could be moved from the position of FIG. 4 to the position of FIG. 5, or vice versa, by the action of introducing the tubular element 14 into the housing part 19, but also in other ways and using suitable means, both automatic and commanded for example by the control unit 26, but also driven manually or other.

In the embodiment shown by way of non-restrictive example, the mobile part 27 is provided, on the opposite sides 31, with suitable pins 29 able to be inserted into corresponding holes 30 made on the fixed part 11, in particular in correspondence with the portion 17 of the fixed part 11.

The pins 29 are directed along an axis of rotation A of the mobile part 27 with respect to the fixed part 11 of the support device 10.

The pins 29 associated with the corresponding holes 30 therefore advantageously allow a snap-in positioning of the mobile part 27 to the support device 10, for example to the fixed part 11.

Naturally, it would be possible to provide other snap-in positioning means of the mobile part 27 on the support device 10.

The mobile part 27 also comprises at least a lever 32 protruding from at least one of the sides 31.

The sides 31 can be opposite and parallel and preferably a lever 32 is provided on each of the sides 31 of the mobile part 27, see in particular FIG. 1.

In the situation of FIG. 4, the levers 32 are positioned above the housing part 19 of the tubular element 14, in particular above the housing seatings 21.

When the tubular element 14 is translated, for example, in the direction V to be taken into the seatings 21, the tubular element 14 itself acts on the levers 32 and determines a rotation R of the mobile part 27 around the axis A, which moves into the position of FIG. 5.

In particular, the segments 28 or contact surfaces of the mobile part 27 draw the tubular element 14 into the seatings 21 of the housing part 19, where the welding is carried out.

Preferably, therefore, the tubular element 14 itself acts on the levers 32 of the mobile part 27 so that the latter, by rotating, passes from the access position of FIG. 4 to the retention position of FIG. 5.

During this rotation R, therefore, the segments 28 or contact surfaces of the mobile part 27 guide the tubular element 14 so that it is correctly positioned in the seatings 21 of the housing part 19, until it is fully inserted.

The position of FIG. 5, with the tubular element 14 correctly inserted into the seatings 21 of the housing part 19 and kept in position also thanks to the segments 28 of the mobile part 27, is therefore suitable to proceed with welding the tubular element 14, by means of the electrodes 24 and 25.

To this end, a sensor 33 can be provided, for example a mechanical, optical, electronic or other sensor, which detects the correct position of the mobile part 27, for example by detecting that the rotation R of the mobile part 27 has taken place.

The sensor 33 can communicate to the control unit 26 the correct positioning of the tubular element 14 in the housing part 19 and then the control unit 26 can initiate the welding operations.

Once welding is complete, the tubular element 14 can be gripped, for example on both sides with respect to the support device 10, and then extracted from the support device 10 and from the welding apparatus 20.

The tubular element 14, during the extraction, acts on the segments 28 of the mobile part 27 so as to take the mobile part 27 again from the position of FIG. 5 to the position of FIG. 4.

In order to guarantee greater stability at least in the two positions of the mobile part 27 shown in FIG. 4 and FIG. 5, the mobile part 27 could be associated with a bi-stable positioning assembly 34.

The positioning assembly 34 can comprise, for example, a suitably shaped tongue 35 provided with supporting fins 36 able to position themselves in corresponding seatings 37 made under the mobile part 27.

The tongue 35 can be associated with at least one elastic element 38, such as a spring or suchlike, able to cooperate, at one end, with a central part of the tongue 35 and able to be fitted, at the other end, on a support element 39, positioned in the fixed part 11 of the support device 10 and suitably oriented.

By means of the bi-stable positioning assembly 34, the mobile part 27 can be positioned in a stable and substantially snap-in manner in the first position of FIG. 4 or in the second position of FIG. 5.

By means of the present support device 10, therefore, it is possible to position the tubular element 14 in the housing part 19, which substantially represents the welding seating, in a suitable and stable manner.

The mobile part 27, as can be seen, in the position of FIG. 5, guarantees optimum coverage of the tubular element 14 and, moreover, helps to maintain the correct positioning of the tubular element 14 until the end of the welding, carried out by means of the electrodes 24 and 25.

Moreover, the mobile part 27 can advantageously be made of transparent material, such as plastic or suchlike, so that it is always possible to verify the state of welding of the tubular element 14, even in the retention and protection position of FIG. 5.

The fixed part 11 could also be made of transparent material, such as plastic or suchlike.

Moreover, the mobile part 27, being preferably associated in a snap-in manner with the fixed part 11, for example by means of the pins 29 inserted in the holes 30 of the fixed part 11, can be easily removed from the fixed part 11 of the support device 10 without using tools or other, so as to proceed with cleaning operations on the electrodes 24 and 25, the housing part 19 or other, or maintenance operations, replacement of parts or other.

As can be understood, moreover, the whole support device 10 can be easily removed from the welding apparatus 20 by removing the attachment means 12.

It is clear that, although the present invention has been described with reference to some specific examples, a person of skill in the art shall certainly be able to achieve many other equivalent forms of support device for a tubular element for a welding apparatus, having the characteristics as set forth in the claims and hence all coming within the field of protection defined thereby.

In the following claims, the sole purpose of the references in brackets is to facilitate reading: they must not be considered as restrictive factors with regard to the field of protection claimed in the specific claims.

The invention claimed is:

1. A support device for a tubular element, comprising: a housing part configured to house, during use, the tubular element,
   the housing part including two opposite walls, each of the opposite walls having a U-shaped seat,
   a mobile part for guiding and positioning the tubular element into the U-shaped seats and for protecting the housing part,
   said mobile part being configured to assume at least:
      a first position in which the mobile part permits placement of the tubular element into the U-shaped seats,
      a second position in which the mobile part retains the tubular element in the U-shaped seats and at least partly covers the U-shaped seats and the tubular element positioned therein, and
   wherein said support device is arranged such that said mobile part includes a lever that shifts with the mobile part as the mobile part shifts from said first position to said second position with the lever being drivable by the tubular element during insertion of the tubular element into said housing part.

2. The support device as in claim 1, comprising a fixed part and snap-in means to connect said mobile part to said fixed part.

3. The support device as in claim 2, wherein said mobile part is connected to said fixed part by a rotation pin inserted into a corresponding hole made on the fixed part and able to allow a rotation of said mobile part with respect to said fixed part between said first position and said second position.

4. The support device as in claim 1, wherein said mobile part comprises at least one segment in contact with the tubular element inserted in said housing part and able to determine the passage of said mobile part from said second position to said first position.

5. The support device as in claim 4, wherein said lever is made to rotate by said tubular element and said segment of the mobile part acts on said tubular element.

6. The support device as in claim 1, wherein said mobile part is provided with an assembly for bi-stable positioning, so that the mobile part is stabilized in the first position to allow insertion of the tubular element and stabilized in the second position to retain the tubular element in the U-shaped seats.

7. The support device as in claim 1, wherein said mobile part is made of transparent material.

8. A welding apparatus for a tubular element, comprising: welding means, and a support device of the tubular element, wherein said support device is provided with at least one housing part and with said welding means, in which the tubular element is positioned in a suitable way for welding, and at least a mobile part for guiding and positioning the tubular element and for protecting the housing part, said mobile part being configured to assume at least a first position in which the mobile part allows placement of the tubular element into a pair of seatings carried by the housing part, and at least a second position in which the mobile part retains the tubular element in the seatings and to at least partly cover said housing part and the tubular element positioned therein, wherein said mobile part of the support device comprises at least a lever for passage from said first position to said second position and drivable by the tubular element during insertion of the tubular element into said housing part.

9. The welding apparatus as in claim 8, wherein said housing part comprises at least a pair of housing seatings for said tubular element, situated on opposite sides with respect to said welding means.

10. The welding apparatus as in claim 8, and further comprising a sensor to detect the positioning of the mobile part in said second position where it at least partly covers the tubular element.

* * * * *